(12) United States Patent
McAlear (10) Patent No.: US 6,754,710 B1
(45) Date of Patent: Jun. 22, 2004

(54) REMOTE CONTROL OF COMPUTER NETWORK ACTIVITY

(75) Inventor: James A. McAlear, Stittsville (CA)

(73) Assignee: Nortel Networks Limited (CA)

( * ) Notice: Subject to any disclaimer, the term of this patent is extended or adjusted under 35 U.S.C. 154(b) by 0 days.

(21) Appl. No.: 09/567,129

(22) Filed: May 8, 2000

(51) Int. Cl.[7] .............................................. G06F 15/16
(52) U.S. Cl. ...................... 709/227; 709/208; 709/245
(58) Field of Search ................................ 709/200, 203, 709/217, 218, 224, 219, 223, 227, 228, 208, 209, 245; 340/3.52–3.54, 825.72; 345/740, 748; 705/35, 39, 42; 456/74.1, 352, 92, 95

(56) References Cited

U.S. PATENT DOCUMENTS

| | | | | | |
|---|---|---|---|---|---|
| 5,309,351 | A | * | 5/1994 | McCain et al. | 340/825.72 |
| 5,943,399 | A | * | 8/1999 | Bannister et al. | 370/493 |
| 5,987,504 | A | * | 11/1999 | Toga | 709/206 |
| 6,119,155 | A | * | 9/2000 | Rossmann et al. | 709/219 |
| 6,138,158 | A | * | 10/2000 | Boyle et al. | 709/225 |
| 6,195,541 | B1 | * | 2/2001 | Griffith | 455/406 |
| 6,198,479 | B1 | * | 3/2001 | Humpleman et al. | 65/415 |
| 6,219,669 | B1 | * | 4/2001 | Haff et al. | 707/10 |
| 6,317,831 | B1 | * | 11/2001 | King | 380/223 |
| 6,356,752 | B1 | * | 3/2002 | Griffith | 455/406 |
| 6,457,060 | B1 | * | 9/2002 | Martin et al. | 709/245 |
| 6,466,971 | B1 | * | 10/2002 | Humpleman et al. | 709/220 |
| 6,519,241 | B1 | * | 2/2003 | Theimer | 709/217 |
| 6,519,568 | B1 | * | 2/2003 | Harvey et al. | 709/217 |
| 6,549,773 | B1 | * | 4/2003 | Linden et al. | 709/227 |

OTHER PUBLICATIONS

Brushan, A.; "The FileTransfer Protocol", Request for Comments (RFC) 354; Jul. 1972.*
Sollins, K.; "The TFTP Protocol (Revision 2)", Request for Comments (RFC) 783; Jun. 1981.*
Postel et al.; "File Transfer Protocol (FTP)", Request for Comments (RFC) 959; Oct. 1985.*
DeSchon et al.; "Background File Transfer Program (BFTP)", Request for Comments (RFC) 1068; Aug. 1988.*

* cited by examiner

Primary Examiner—Marc D. Thompson
(74) Attorney, Agent, or Firm—Steubing McGuinness & Manaras LLP (57) ABSTRACT

A wireless remote control is disclosed for controlling computers remotely over a data network. The wireless remote control system includes Remote Access Programs running on data network servers, which provide access to, and disposition of data objects. The wireless remote control system is particularly useful for overcoming the difficulty of handling data over a low bandwidth wireless link with the minimal display facilities of a wireless handset or Personal Digital Assistant and of providing linkage between data objects on one computer and applications residing on another computer under the direct supervision of the user without the data objects needing to traverse the low bandwidth link.

33 Claims, 8 Drawing Sheets

REMOTE CONTROL OF COMPUTER NETWORK ACTIVITY

FIELD OF THE INVENTION

The present invention relates to remote control of computer network activity and is particularly concerned with providing remote users with a means for manipulation of data objects and initiation of applications between collaborating computers.

BACKGROUND OF THE INVENTION

Recent developments in telecommunications have resulted in networks for a wide variety of services. A large variety of these services have been configured so as to be accessible via the now standard web-browsing model using the Hyper-Text Mark-up Language (HTML). In this configuration, the target content is placed on an origin server that supports the Hyper-Text Transfer Protocol (HTTP). A remote client can issue a specific HTTP request to this server for specific content or application interfaces by providing a Uniform Resource Locator (URL) to uniquely specify which resource is required. The origin server typically responds by providing the client with an HTML document that the remote client then renders on a viewing screen of a personal computer.

Further developments in this area are the development of protocols for devices with limited screen and keyboard resources, such as Personal Digital Assistants (PDAs) and wireless handsets. Of particular relevance in this regard is a protocol termed Wireless Applications Protocol (WAP), a widely adopted new standard for wireless handsets with screens, set by the Wireless Application Protocol Forum and published in "Wireless Application Protocol Architecture Specification", April 1998. The WAP standards define a screen phone capability and a corresponding server document language called the Wireless Mark-up Language (WML) that interact to allow a limited form of web browsing on wireless phones.

In the WAP model, the origin server will respond to HTTP requests by sending the client a WML document, as opposed to an HTML document, for the client to render on the viewing screen. As with HTML, the WML language provides for constructs that associate the selection of highlighted text (a so-called hypertext link or hyperlink) with a URL such that selecting the hyperlink causes the browser to request a new WML document associated with the URL from either the same or an other origin server as dictated by the URL. The new URL request results in the origin server providing the client with a new WML page for display or other operation. Besides hyperlinks, WML allows for user input of numbers and letters in input fields, as well as constructs that provide soft-keys/buttons for specific functions on a WML page.

The responses from the origin server (i.e. the WML document) sent to the client over the Internet, exit the Internet through a gateway server to be transferred over the wireless network to the client. The gateway server encodes the WML document into a compact form more suitable for both transmission over low speed wireless connections, and more suitable for processing by devices with limited memory and computational capabilities (wireless handsets and PDAs).

The provision of the WAP addresses one aspect of the limitations of portable devices, namely the reduced resources available such as screen size, keyboard, memory, and computational power.

The utilisation of WAP opens another potential need for the user. If the remote client is communicating with the origin server using WML, then it may be inferred that the user is remote from their more comprehensive access devices, such as a PC (personal computer).

For users remote from their personal computers, there does exist software programs which allow access to the computer. One such program is the popular Timbuktu Pro software program, a product of Netopia Inc., which allows users to operate computers from the remote control of another computer. This is achieved by having a copy of the Timbuktu Pro software resident on both the target (the computer to be controlled) and the remote computer. The Internet is used to link into the target PC and control its operation. In operation, the controlling computer has a program window open, which mirrors the display screen of the target computer. Operations performed within this window are transmitted and acted upon by the target computer as if the operations were transpiring at the target computer. Thus the remote user can effect full control of the target computer.

Other forms of remote control allow a device (often a LAN (local area network) switch or other piece of networking gear) to allow remote control through a web browser interface (such as Netscape Navigator™, a Trademark of Netscape Communications Corporation, or Microsoft® Internet Explorer). In such configurations, the target device has web-hosting capability (can act as an origin server), and controlling computers can navigate to the web page of the device and once there, control the settings and configuration parameters of the device by interacting with the device's web page.

A further form of remote control is Telnet, which allows a remote computer using Telnet software to access a target computer, server, or other piece of networking gear that also has Telnet capability; to control the settings and configuration parameters of the target device using a command-line style of interaction.

A significant limitation of these forms of remote control, is that the device used for remote control, for all practical purposes, needs to be a computer with full keyboard and screen unto itself; requiring for example a keyboard and mouse, a large display, an Internet connection and sufficient processing power to run a software utility such as Timbuktu Pro or Telnet, as well as provisions for installing such software. Therefore, there is a need for a method of remotely directing computer activity across a network while constrained by bandwidth, display, and processing capabilities at the remote end.

SUMMARY OF THE INVENTION

This invention is directed to a method and apparatus for providing an improved remote control of computer network activity.

In accordance with an aspect of the present invention there is provided a method of remotely directing data transfers comprising the steps of: accessing a data server from a wireless terminal; specifying a source for desired data; specifying a destination for receiving the desired data; and the data server effecting transferring the desired data from the source to the specified destination.

In an embodiment of the present invention the wireless terminal is a display terminal, the data server is an Internet protocol server, source and destination locations are specified by one or a combination of navigating hyperlinks, selecting from a list, or explicitly providing a location address, and transferring of the desired data is effected according to an Internet protocol.

In accordance with another aspect of the present invention there is provided a method of remotely directing data transfers comprising the steps of: accessing a page at a first server from a wireless display terminal; specifying desired data; specifying an initial destination address; accessing a second server at the initial destination address; specifying a specific desired destination at a final server; sending the specific desired destination address from final server to first server; and transferring desired data from the first server to the specific desired destination.

In an embodiment of the present invention the page accessed at the first server is an Internet web page, desired data and destination locations are specified by one or a combination of navigating hyperlinks, selecting from a list, or explicitly providing a location address, and a further step of providing a confirmation indication of the transferring of desired data is implemented. Further, in the application of this embodiment, it may result that the final server is the second server.

In accordance with another aspect of the present invention there is provided a method of remotely directing data transfers comprising the steps of: accessing a server from a wireless display terminal; specifying desired data; selecting a specific desired destination; and transferring desired data from the server to specific desired destination.

In an embodiment of the present invention the accessing of the server is an accessing of an Internet web page, desired data and specific desired destination locations are specified by one or a combination of navigating hyperlinks, selecting from a list, or explicitly providing a location address, and a further step of providing a confirmation indication of the transferring of desired data is implemented. Further, in the application of this embodiment, it may result that the desired data and specific desired destination are on the same server.

In accordance with another aspect of the present invention there is provided a device for interfacing at least one wireless display telephone terminal with a plurality of Internet site locations, said device comprising: a first memory for retrieving and storing a source resource location address; a second memory for retrieving and storing a destination address; and a transmitting section for transmitting the source resource located at the source resource location address to a destination resource located at the destination address location.

In an embodiment of the present invention the source resource location address, destination address, and a prompt for the transmitting section are provided by a wireless display telephone.

In accordance with yet another aspect of the present invention there is provided a system for linking a remote terminal in an data network environment with a plurality of network computers, wherein the network of computers contain a plurality of files, said system comprising: a hosting device residing on an network computer and including: a first memory, for retrieving and storing a source resource location address; a second memory, for retrieving and storing a destination address; and a transmitting section, for transmitting the source resource located at the source resource location address to a destination resource located at the destination address location; and a remote terminal for indicating said source resource location address, said destination address, and prompting said transmitting section.

In an embodiment of the present invention the data network environment is an Internet protocol environment, the remote terminal is a wireless terminal, and a further addition of a wireless gateway connecting the wireless terminal to the Internet protocol environment is provided.

In accordance with a further aspect of the present invention there is provided a system for linking a wireless display terminal in an Internet protocol environment with a plurality of Internet servers, wherein the Internet servers contain a plurality of files containing hyperlinks, said system comprising: a wireless gateway for connecting the wireless terminal with the Internet; a hosting device residing on an Internet site server and including: a first memory, for retrieving and storing a source resource location address; a second memory, for retrieving and storing a destination address; and a transmitting section, for transmitting the source resource located at the source resource location address to the destination resource located at the destination resource location address; and a wireless terminal for indicating said source resource location address, said destination address, and prompting said transmitting section.

In an embodiment of the present invention, the wireless terminal is a display terminal.

In accordance with yet a further aspect of the present invention there is provided a computer for remotely directing data transfers comprising: a memory containing: a server computer program for: presenting sources of desired data to a first remote address; receiving a specific source address identifying desired data; receiving a destination address different than said first remote address; transferring the desired data from the location specified by the specific source address to the destination address; and a processor for running the computer program.

In an embodiment of the present invention the specific source address and destination address are specified by one or a combination of navigating hyperlinks, selecting from a list, or explicitly providing a location address, the computer is an Internet protocol server, and the transferring the desired data is effected according to an Internet protocol.

In accordance with another aspect of the present invention there is provided a computer readable medium whose contents cause a computer system to transfer data under remote direction, the computer system having a first memory for retrieving and storing a source resource location address, a second memory for retrieving and storing a destination address; and a transmitting section for transmitting a source resource located at the source resource location address to a destination resource located at the destination location address, by performing the steps of: storing an address in the first memory under remote direction from a first remote address; storing an address in the second memory under remote direction wherein said address in the second memory is different from said first remote address; and transmitting the data so indicated by the address in the first memory to the destination so indicated in the second memory.

In an embodiment of the present invention the addresses stored in the first and second memories and the remote address refer to addresses on a computer network. Further an alternate embodiment has the computer network as an Internet protocol network.

An advantage of the present invention is that of providing a measure of relief from the difficulty of handling data over a low bandwidth remote links when the remote station has minimal display facilities such as is the case with a wireless handset or Personal Digital Assistant by providing linkage between data objects on one computer and applications residing on another computer without the data objects needing to traverse the low bandwidth link.

BRIEF DESCRIPTION OF THE DRAWINGS

The present invention will be further understood from the following detailed description, with reference to the drawings in which.

DETAILED DESCRIPTION

Reference will now be made in detail to embodiments of the invention, examples of which are illustrated in the accompanying drawings. Wherever possible, the same reference numbers will be used throughout the drawings to refer to the same or like parts.

Figure 1:
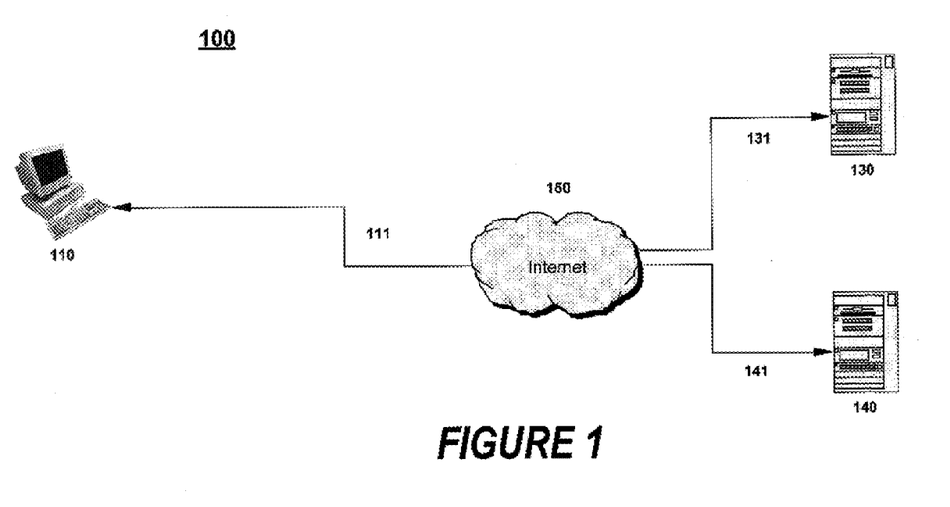
FIG. 1 illustrates a standard Internet HTTP transaction between a remote client and an origin server.

FIG. 1 is a block diagram showing a standard configuration for an Internet access system connecting a remote client 110 (typically a computer terminal) to host server 130 or 140. The Internet 150, also known as the World Wide Web or Web, are generic terms for a multiple of well known protocols and standards used over a data network including such connections as 111, 131, and 141. Host servers 130 and 140 are remote computer systems accessible over the Internet or other communication medium along line 131 and 141 respectively. These servers present the accessed Web pages to the requester at the remote client 110.

Figure 2:
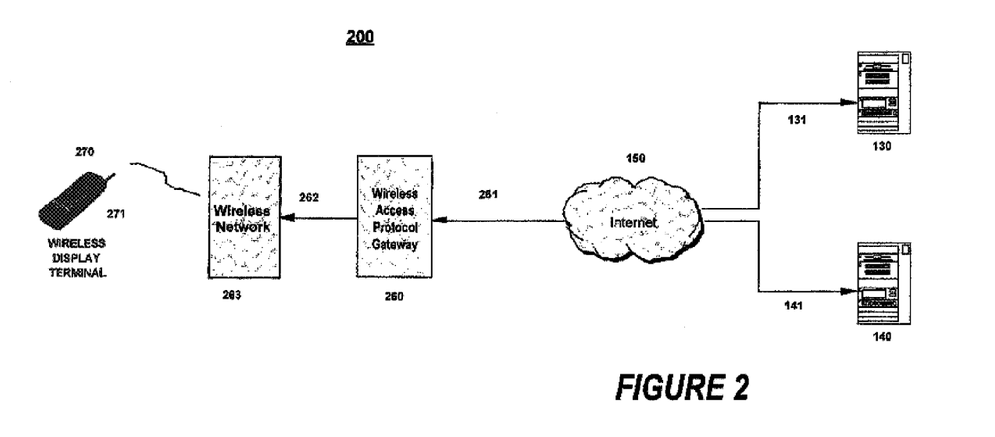
FIG. 2 illustrates a Wireless Application Protocol (WAP) transaction between a remote wireless client and an origin server.

FIG. 2 is a block diagram showing a similar Internet system connecting a remote wireless client 270 through the wireless network 263 and a Wireless Access Protocol gateway 260 to host servers 130 and 140. The contrasting differences between these two configurations is the remote client, which in FIG. 2 is some form of wireless terminal 270 (commonly a wireless handset with display, or a wireless Personal Digital Assistant (PDA), although possibly a wireless computer terminal configured to support voice services) and as such will have a display more appropriate to WML documents as opposed to the remote client terminal 110 of FIG. 1 which is suited to the standard HTML (Hyper-Text Markup Language) documents.

Figure 3:
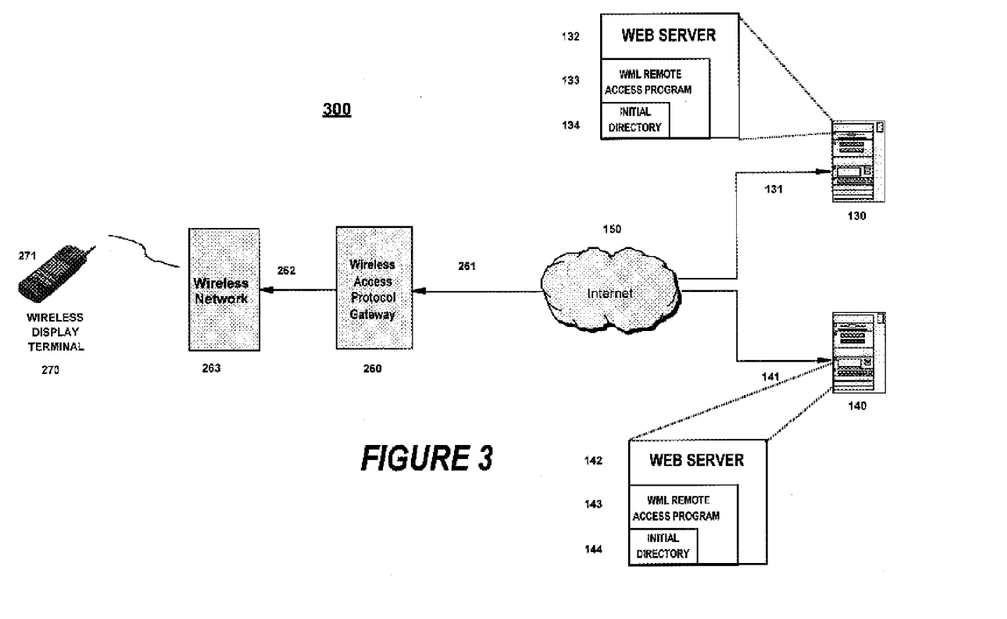
FIG. 3 illustrates a pair of Host Servers equipped with a Wireless Markup Language (WML) Remote Access Program in accordance with an embodiment of the present invention.

FIG. 3 is a block diagram consistent with an embodiment of the present invention showing the existence of a WML Remote Access Programs 133 and 143 as part of the Web Servers 132 and 142. These servers present the accessed Web pages to the requestor at the remote client in this case the Wireless Access Protocol (WAP) Gateway 260, for transfer over the wireless network 263 to the wireless remote client 270. The accessing of these Web pages often initiates further activity on the part of the servers, for example initiating on-line orders for electronic commerce applications. The WAP Gateway 260 encodes the WML document into a compact form that is more suitable for transmission over low speed wireless connections. Wireless handset 270 with display screen 271 is a Wireless Access Protocol compatible device capable of supporting WML browsing. The exact functions performed by the Gateway server, the wireless network, and even the precise form of rendering the WML document on a handset, are transparent to this invention.

The WML Remote Access Programs 133 and 143 are installed by the servers' administrators and are accessible by a URL, that is, the host server will have an IP address with the WRA Program being accessible through standard URL descriptors comprising an IP address and resource path identifier (often exploiting the Domain Name System (DNS) capability to access an IP address). Associated with each WRA Program 133 and 143 are initial directories 134 and 144. In each initial directory, the respective server administrator will place selected resources that will be accessible to remote operations. These resources may consist of content files, application aliases, sub-folders, and aliases or links to other folders, as an example.

FIG. 3 shows the elements involved in order to remotely manipulate resources residing on or accessible to host servers 130 and 140. The system 200 permits a user to access Internet locations through the Internet 150. The wireless handset 270 transmits a request through the wireless network 263 along link 262 to be decoded by the Wireless Access Protocol Gateway (WAP Gateway) 263 which reformats and forwards the request to host servers 130 or 140 as appropriate. This may involve interpreting the received request message to generate a corresponding HTTP (Hyper-Text Transfer Protocol) formatted message. Once host server 130 or 140 receives a request, it transmits a document back to the wireless handset 270 via the Internet 150, the WAP Gateway 260, and wireless network 263, while also initiating any appropriate further processing activity. As previously described, the WAP Gateway 260 encodes the WML document into a compact form that is more suitable for transmission over low speed wireless connections.

An embodiment of the invention, which utilises server programs specifically designed to collaborate with each other according to a convention defined herein, encompasses five steps of operation.

As a brief summary, an HTTP URL typically has the form:
"http://www.acme.com/path/file.wml?parameter1=abc&parameter2=123".

where:
"http://" denotes the http scheme for processing a URL,
"www.acme.com" refers to the network location and can be translated into an IP address through the DNS system,
"/path/file.wml" is the identifier for the particular resource at that network location, and
"?parameter1=abc&parameter2=123" is a query construct that allows a client to pass data parameters to the identified resource. In this example the parameter names are "parameter1" and "parameter2" whose values are "abc" and "123" respectively.

The server interactions described in this embodiment are part of an extended "cut and paste" metaphor to be provided to the handset user, for the user to understand the directing of data transfers between computers. The user can understand navigating source resources, identifying and performing a "cut" on the resource for transfer, then navigating to a subsequent server, and then on to a precise final destination where a "paste" operation can be effected, causing the original selected resource to be transferred.

Figure 4:
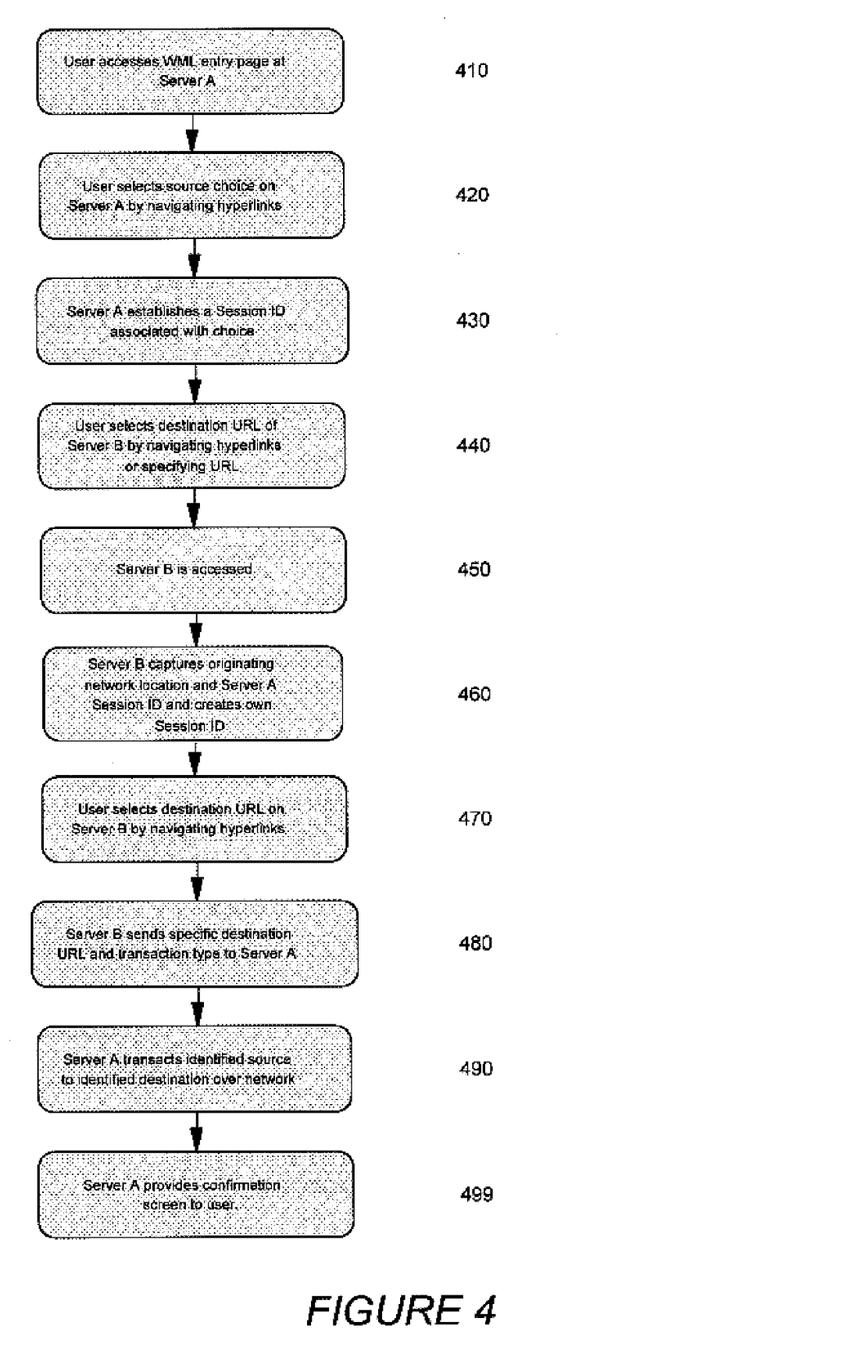
FIG. 4 is a flowchart showing a method used to remotely access the WML Remote Access Programs and manipulate data entities using a WAP phone set consistent with FIG. 3.

The operation may be conveniently understood by the steps that follow and FIG. 4 which schematically illustrates the steps:

1. The source server program "A" provides a WML document with source resource choices represented by hypertext links, thereby allowing navigation and selection of a source choice 410. Once a particular choice is made by a "cut" 420, a server side effect operation is to note the resource selected and associate it with a newly created session identifier (Session ID) for that particular remote user making the selection 430. This Session ID is used to differentiate requests if the source server will be simultaneously processing requests from more than one remote user.
2. As a response to the chosen resource selection link, the server "A" provides another screen (i.e. WML document) or set of screens where the user can enter or select a destination (e.g. either select a pre-set destination or enter a new destination) 440. Embedded within the "OK/Accept" command/link for the final destination selection screen will be a URL for the destination server. In addition to the network location, the generated HTTP URL request 450 will also comprise path and query fields according to the convention for collaboration. In this case the path would be "/wra/pindex.wml" to begin at the top level to choose the precise ("Paste") destination resource. The query field would encode the network location of server A and the session ID at server A (e.g. "?asessid=139&netlocnjdoe.acme.com").
3. The destination server "B" program stores in memory the session ID, the originating network location and creates a unique session ID for itself associated with these data and returns to the handset a document that allows the navigation/selection of the destination resource choice 460.
4. Upon receipt of the user response that selects the precise destination resource 470, the destination server sends a message to the source server "A" at a specific URL constructed from network location and source session ID, where the message contains the URL of the selected "paste" destination URL 480. This message can for example be sent with a HTTP transaction e.g. "http://jdoe.acme.com/wra?asessid=139&url=ftp%3A%2F%2Fhotelx.com%2F dropbox". Additionally, returned to the remote handset will be a confirmation screen. In this confirmation screen, the "OK/Accept" command will hyperlink back to the source server "A" at a specific URL that can confirm the completion of the overall transaction e.g., "http://jdoe.acme.com/wra/tconfirm.wml?asessid=139".
5. The source server "A", having received the URL of the destination resource associated with the original session ID, accesses the source resource and links it to the destination resource without passing the connection through the handset 490. With the handset having been linked back to the source server "A", the source server "A" can provide one or more confirmation screens 499 on the status of the linking of the resource or ask the user for any transfer options as appropriate or may bring the user back to the beginning of the selection sequence to select another resource for transfer.

Figure 5:
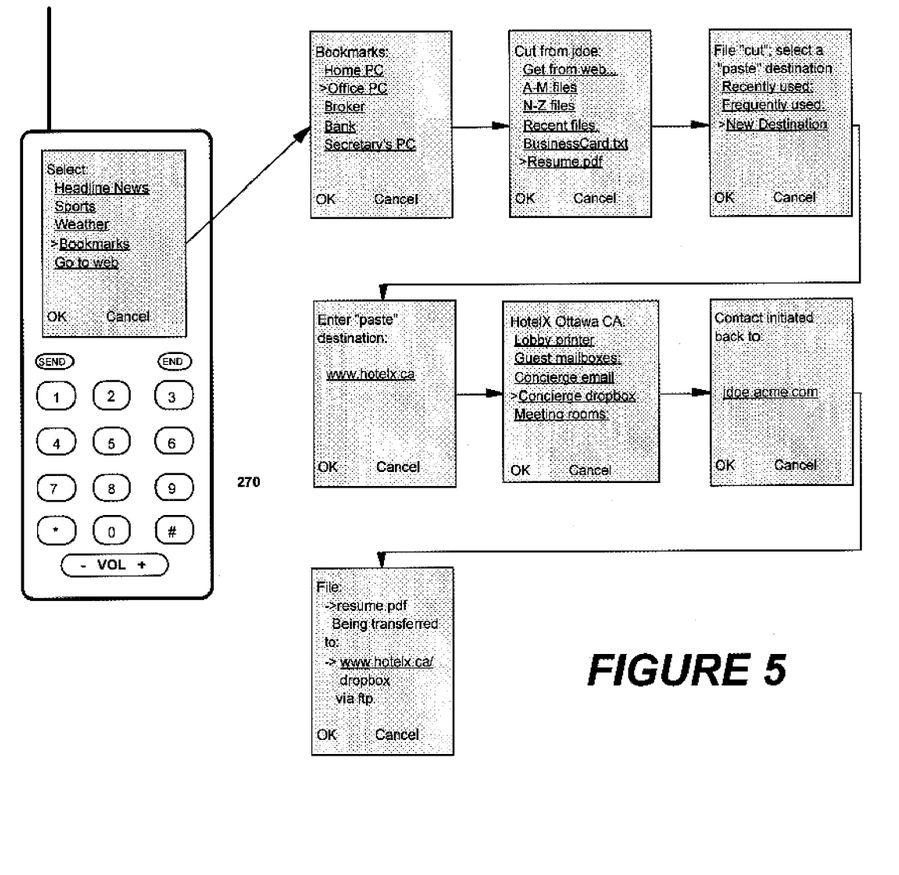
FIG. 5 illustrates an example session of the invention as might be observed from the user of the wireless handset consistent with the method of FIG. 4.

FIG. 5 provides an example series of session screens as might be observed in accordance with this embodiment.

Several notes are in order with respect to the steps. The first is that a useful convention would be to have the WML access page resident at a well-defined address on every server supporting this embodiment of the invention. A useful convention would be to have this WML document in the path "/wra/cindex.wml" on source server "A" for example.

With regard to step 2 above, WML has a mechanism such that if the destination network location is manually entered into the handset using keys on the handset, that the selection of the "OK/Accept" key will cause the handset to issue a HTTP URL request at the entered network location—otherwise, pre-established destination choices would be presented that already have the network locations embedded.

With regard to step 3 above, the destination server B might offer links to other servers as an eventual destination (e.g. acting as a directory for an organization). If the remote user were to select one of these other servers, the URL embodied by this selection would cause a branch to the selected network location and also have a query field that encodes the original network location and session ID associated with server A. In this way, the steps are completed as described with this new server "C" taking on the role of server B as described above.

With regard to Step 4 in the example the characters ":" and "/" have been escaped with their hexadecimal notations according to conventions for passing special characters within URL query fields, so as to remove difficulties in separating query parameters from the rest of the URL.

The source resource may be linked to the destination resource in a number of alternate forms depending upon the type of URLs involved. For example, if the destination resource is an "ftp:" prefaced URL, the source resource will be transferred as a file to the destination. If the destination resource is a "mailto:" URL, the source resource will be sent via email to the destination—likely as an email attachment. If the resource is a "sip:" URL, the source resource will attempt to set up a multimedia stream session to the destination for transfer of the resource. Furthermore, depending upon the nature of the source and destination resources—these may be more than just static files and may in fact be computer programs, thus more complex and two-way interactions may be initiated between these resources. The operations around ftp, mailto and sip are beyond the scope of the invention and are already known to those skilled in the art of server design.

In yet another embodiment, the linking of the source and destination would be achieved in a different manner. The above exemplary embodiment was based on servers specifically adhering to a convention to allow the interaction—even though the servers may be administered under different authorities. The alternative embodiment described here does not require different servers to adhere to an established convention, but instead relies on a single specialized server A to execute the specific functions. The user would have access to this server and get access to it through a particular URL e.g. http:H/www.acme.com/wra/cpindex.wml".

Figure 6:
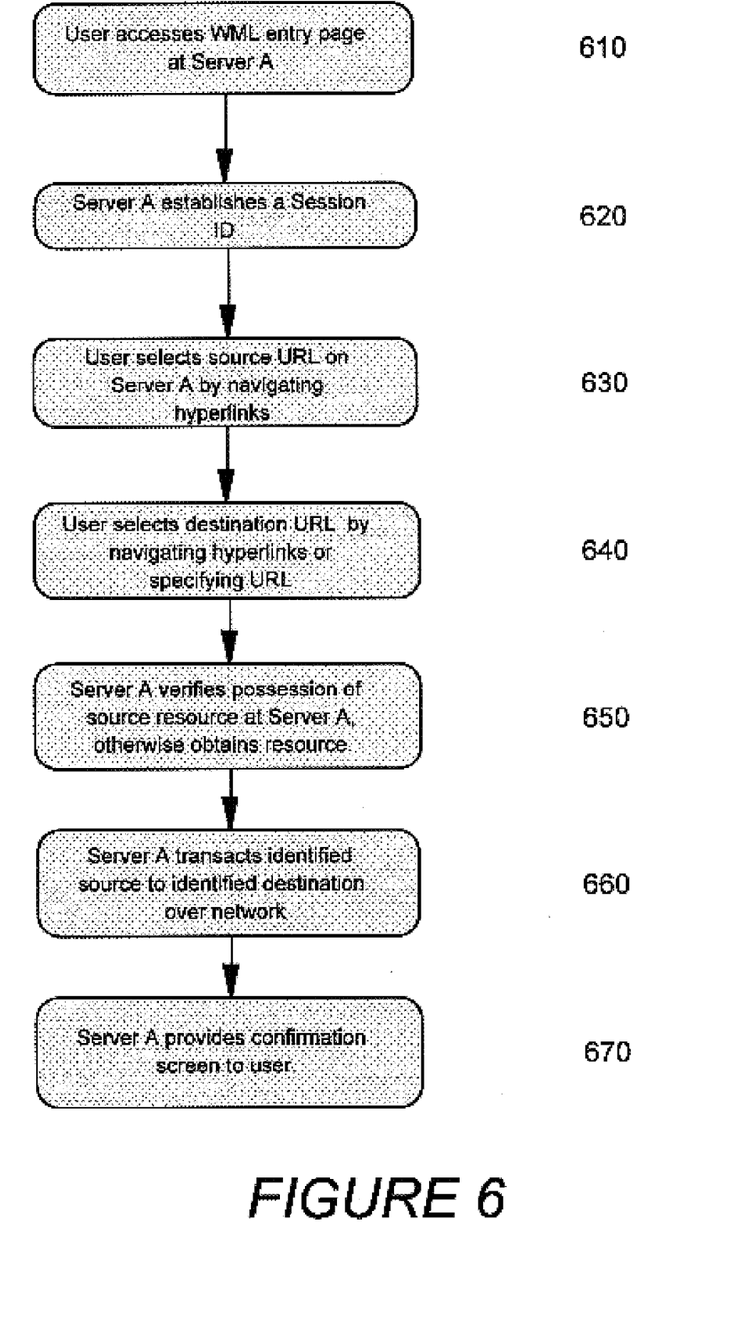
FIG. 6 is a flowchart showing a method used to remotely access the WML Remote Access Program resident upon a single server in accordance with an embodiment of the present invention.

The operation may be conveniently understood by the steps that follow and FIG. 6 which schematically illustrates the steps:

1. The server A offers a screen selection (WML document) to select a source resource either as a preset link or links, or allow a user to manually enter a URL for a resource elsewhere on some arbitrary other server (e.g. the user entered: "www.hotelx.ca/index.html") 610. The server will also make note of a session ID 620.

2. The server A notes the choice of the user and returns a screen that will offer the user the choice of selecting that precise resource, or navigating links within that document to further select a resource 630.

3. The user having selected the precise resource, Server A notes the resource's URL and associates it with the session ID using the query constructs in a manner described in the example above. Then returned to the handset is a screen allowing the selection or entry of the destination resource 640. The user will manually enter, or navigate to and select a destination URL choice.

4. Once the destination URL is confirmed to the server, the server will then cause the transfer or linkage between the source and destination 660 including first getting the source resource if it is not already resident on the server 650. At this time the server can present confirmation 670 or transfer option screens to the user as described in the embodiment above.

Figure 7:
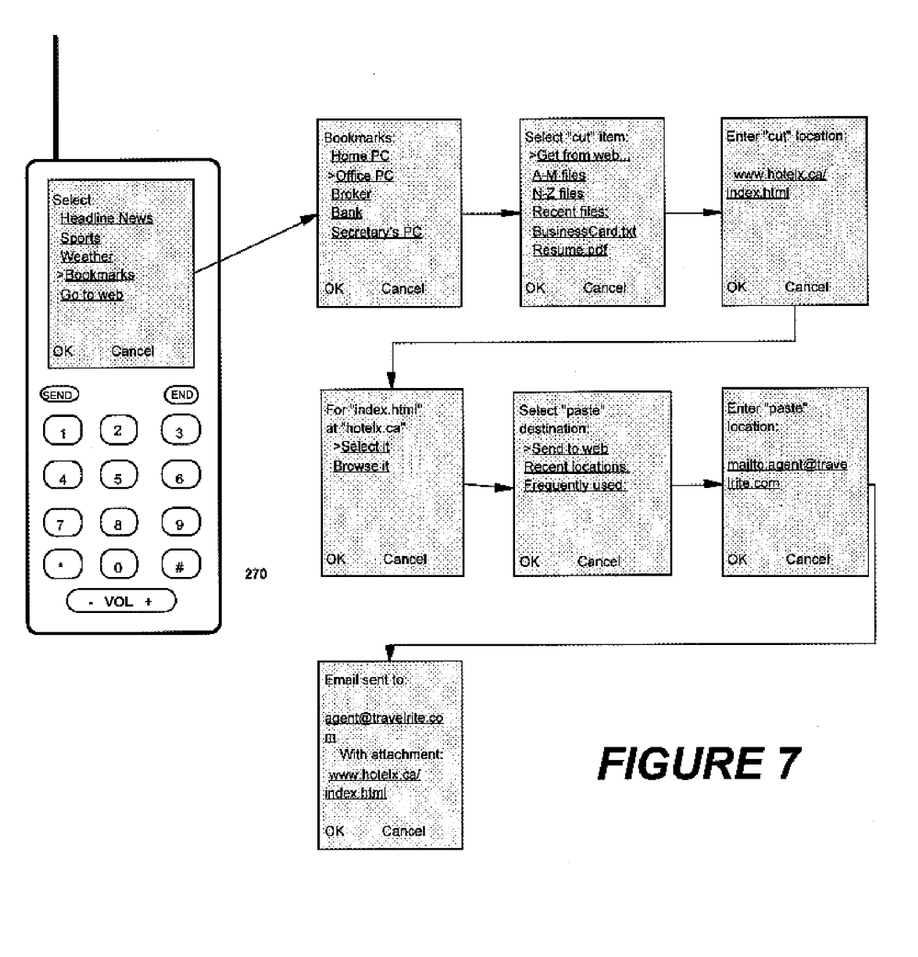
FIG. 7 illustrates another example session of the invention as might be observed from the user of the wireless handset consistent with the method of FIG. 6.

FIG. 7 provides an example set of session screens as might be observed in accordance with this embodiment.

With regard to step 2, if the user chooses to navigate the resource, server A will get the resource if it is a HTML or other standard document type capable of embedded hyperlinks, and presents the labels of the document's hyperlinks in a further set of screens. Again the user will be recursively presented with the choice of selecting the chosen resource or further navigating within the selection. This provides for the use of hyperlinks within subfolders as well as documents.

With regard to step 3, particularly easy to use destination URLs are "ftp:" and "mailto:" which can cause a file transfer or email of the selected resource to a destination file directory or email account.

In addition to using WAP/WML it is also possible to use the precursor browser phone standard of HDML (Handheld Device Mark-up Language) to achieve the same goals. Persons skilled in the art will be able to make an appropriate translation between the example WML embodiments and HDML versions. Further, such functionality can similarly be provided to such handheld devices or other lightweight clients that are capable of displaying HTML (Hyper Text Mark-up Language). In general, HTML and its versions and variants also have the constructs needed to enable and provide these functions represented by the examples above.

In yet a further embodiment, a user would enter numbers into a handset rather than letters as an alternative to entering the URL of the destination server when first choosing to go to server "B" to select a resource. A proposed IETF facility to associate URLs with telephone numbers will allow telephone numbers to be cross-referenced with URLs. The source server "A" would use this facility to translate a user entered telephone number into a destination URL for navigation.

In yet a further embodiment of the invention there is support for the occasion when a user wants to "cut" a resource from an arbitrary web location (as in a mouse controlled "cut-and-paste" operation for example), and also wishes to minimise the manual entry of URLs to complete the operation, as well as being able to make use of bookmarked URLs/contact lists, or other such compendiums at one of the PCs or servers under his control. In this example embodiment, the operation would take place per the following seven steps.

1. The user would first use his handset bookmarks to link to his PC, which would then offer the user a choice of "CUT" operations.

2. Upon choosing to access a general web resource, the PC offers the user an entry screen to enter the URL of the web location from which to access the resource to be "CUT". Embedded within the "OK/Accept" key query field is the network location of the PC.

3. Upon entering the network location part of the URL, and pressing the "OK/Accept" key, the handset links to the entered URL location. By established default, this would access the top-level navigation screen for "CUT" resources. This server also notes the network location of the PC from the query field and creates a unique session ID associated with it.

4. Once the user has navigated to and selected the resource to be "CUT", the server will offer a choice of paste destinations either as a link back to the PC or entry of a new URL. In the example here, it will be assumed that the user will first link back to his PC through the choice of the proper hyperlink. This hyperlink will have embedded into it the session ID of the server and the network location of the server.

5. At the user's PC, the PC will make note of the server and server's session ID and create a unique session ID of its own for this interaction. The PC will also offer up a choice of destinations either within the PC or links outside the PC.

In this example, the user chooses links from his email contacts stored on the PC.

6. Once the server notes the email contact chosen by the user, the server then sends back that email URL (more properly URI) back to the origin server as part of the query field and also includes as part of the query field the original server session ID. The PC offers a confirmation screen that the message is being sent back to the server. The "Accept/OK" link causes the handset to link back to the server to receive a status message. Embedded within the query part of this URL is the session ID of the original server choice.

7. The server then offers a status screen to confirm the operation. It would be useful if in the embedded "Accept/OK" key the user could branch back to his PC to initiate another operation there.

Figure 8:
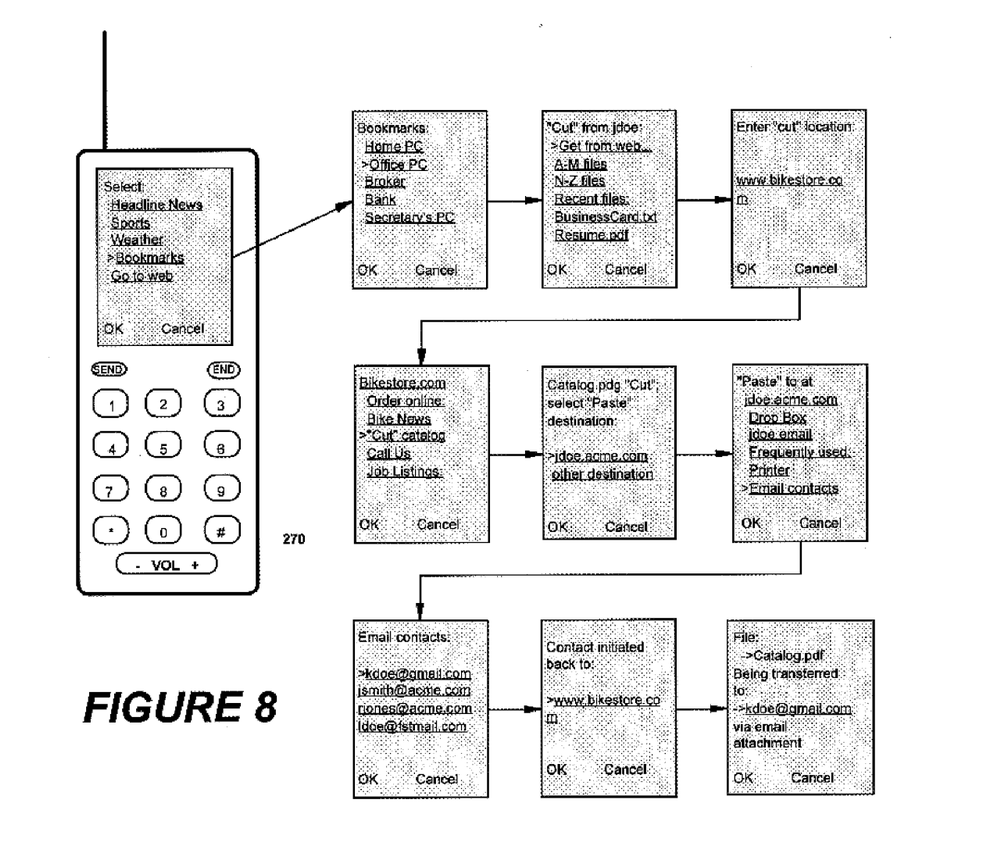
FIG. 8 illustrates another example session of the invention as might be observed from the user of the wireless handset consistent with another embodiment of the present invention.

FIG. 8 provides an example set of session screens as might be observed in accordance with this embodiment.

Other embodiments of the invention will be apparent to those skilled in the art from consideration of the specification and practice of the disclosed embodiments. The specification and examples are exemplary only, and the true scope and spirit of the invention is defined by the following claims and their equivalents.

What is claimed is:

1. A method of remotely directing data transfers comprising the steps of:

accessing a data server from a wireless terminal;

specifying a source for desired data;

establishing a session identifier associated with the source for the desired data and a user accessing the data server from the wireless terminal;

specifying a destination for receiving the desired data;

receiving the session identifier at the data server in a request for the desired data; and the data server, responsive, at least in part, to the session identifier in the request for the desired data, transferring the desired data from the source to the specified destination via the Internet.

2. A method as claimed in claim 1 wherein the data server is an Internet protocol server.

3. A method as claimed in claim 2 wherein the transferring of desired data is effected according to an Internet protocol.

4. A method as claimed in claim 1 wherein the wireless terminal is a display terminal.

5. A method as claimed in claim 4 wherein the desired data source is specified by at least one of the group consisting of navigating hyperlinks, selecting from a list, and explicitly providing an address.

6. A method as claimed in claim 5 wherein the step of specifying a destination is effected by at least on of the group consisting of navigating hyperlinks, selecting from a list, and explicitly providing an address.

7. A method as claimed in claim 4 wherein the step of specifying a destination is effected by at least one of the group consisting of navigating hyperlinks, selecting from a list, and explicitly providing an address.

8. A method of remotely directing data transfers comprising the steps of:

accessing a page at a first server from a wireless display terminal;

specifying desired data;

establishing a session identifier associated with the desired data and a user accessing said data server from the wireless display terminal;

specifying an initial destination address;

accessing a second server at the initial destination address;

specifying a specific desired destination at a final server;

sending the specific desired destination and the session identifier in a request for the desired data address from the final server to first server; and transferring responsive at least in part to the session identifier in the request for the desired data, the desired data from the first server to the specific desired destination.

9. A method as claimed in claim 8 wherein the final server is the second server.

10. A method as claimed in claim 8 wherein the step of accessing a page at a first server comprises accessing an Internet web page.

11. A method as claimed in claim 8 wherein the step of specifying desired data is effected by at least one of the group consisting of navigating hyperlinks, selecting from a list, and explicitly providing an address.

12. A method as claimed in claim 8 wherein the step of specifying an initial destination address is effected by at least one group consisting of navigating hyperlinks, selecting from a list, and explicitly providing an address.

13. A method as claimed in claim 8 wherein the step of specifying a specific desired destination is effected by at least one of the group consisting of navigating hyperlinks, selecting from a list, and explicitly providing an address.

14. A method as claimed in claim 8 comprising the additional step of providing a confirmation indication of the transferring of desired data.

15. A method of remotely directing data transfers comprising the steps of:

accessing a server from a wireless display terminal;

specifying desired data;

establishing a session identifier associated with the desired data and a user accessing said data server from the wireless display terminal;

selecting a specific desired destination; and receiving the session identifier at the server in a request for the desired data; and transferring, responsive at least in part to the session identifier in the request for the desired data, desired data from the server to specific desired destination via the Internet.

16. A method as claimed in claim 15 wherein the step of specifying desired data is effected by at least one of the group consisting of navigating hyperlinks, selecting from a list, and explicitly providing an address.

17. A method as claimed in claim 15 wherein the step of specifying a specific desired destination is effected by at least one of the group consisting of navigating hyperlinks, selecting from a list, and explicitly providing an address.

18. A method as claimed in claim 15 comprising the additional step of providing a confirmation indication of the transferring of desired data.

19. A method as claimed in claim 15 wherein the desired data and specific desired destination are on the same server.

20. A method as claimed in claim 15 wherein the step of accessing a server comprises accessing an Internet web page.

21. A device for interfacing at least one wireless display telephone terminal with a plurality of Internet site locations, said device comprising:

a first memory for retrieving and storing a source resource location address and a session identifier associated with a source resource located at the source resource location and a user accessing said device from the wireless display telephone;

a second memory for retrieving and storing a destination address; and a transmitting section responsive at least in part to the session identifier received in a request for the source resource, for transmitting the source resource located at the source resource location address to a destination resource located at the destination address location via the Internet.

22. A system for linking a remote terminal in a data network environment with a plurality of network computers, wherein the network of computers contain a plurality of files, said system comprising:

a hosting device residing on a network computer and including:

a first memory, for retrieving and storing a source resource location address of a source resources including at least one of the plurality of files, and for storing a session identifier associated with the source resource and a user accessing the system from the remote terminal;

a second memory, for retrieving and storing a destination address associated with a second computer;

a transmitting section, responsive at least in part to receipt of the session identifier in a request for the source resource, for transmitting the source resource located at the source resource location address to a destination resource located at the destination address location; and wherein said remote terminal is operable to indicate said source resource location address, said destination address, and cause said transmitting section to transmit.

23. A system as claimed in claim 22 wherein the data network environment is an Internet protocol environment.

24. A system as claimed in claim 22 wherein the remote terminal is a wireless terminal, and further comprises a wireless gateway connecting the wireless terminal to the Internet.

25. A system for linking a wireless display terminal in Internet protocol environment with a plurality of Internet servers, wherein the Internet servers contain a plurality of files containing hyperlinks, said system comprising:
- a wireless gateway for connecting the wireless terminal with the Internet;
- a hosting device residing on an Internet site server and including:
  - first memory, for retrieving and storing a source resource location address of a source resource, and for storing a session identifier associated with the source resource and a user accessing said system from the wireless terminal;
  - a second memory, for retrieving and storing a destination address; and
  - a transmitting section, responsive at least in part to receipt of the session identifier in a request for the source resource, for transmitting the source resource located at the source resource location address to the destination resource located at the destination resource location address via the internet; and
  - wherein the wireless terminal is operable to indicate said source resource location address, said destination address, and cause said transmitting section to transmit.

26. A computer for remotely directing data transfers comprising:
- a memory containing:
  - a server computer program for:
    - presenting sources of desired data to a first remote address;
    - receiving a specific source address identifying desired data;
    - establishing a session identifier associated with the desired data and a user accessing said server computer from a remote wireless display terminal;
    - receiving the session identifier at the server in a request for the desired data together with a destination address different than said first remote address;
    - transferring, responsive at least in part to the session identifier received in the request for the desired data, the desired data from the location specified by the specific source address to the destination address via the Internet; and
- a processor for running the computer program.

27. A computer as claimed in claim 26 wherein the specific source address is received by at least one of the group consisting of navigating hyperlinks, selecting from a list, and explicitly providing an address.

28. A computer as claimed in claim 26 wherein the destination address is indicated by one of the group consisting of navigating hyperlinks, selecting from a list, and explicitly providing an address.

29. A computer as claimed in claim 26 wherein the computer is an Internet server.

30. A computer as claimed in claim 26 wherein the transferring of desired data is effected according to an internet protocol.

31. A computer readable medium whose contents cause a computer system to transfer data under remote direction, the computer system having a first memory for retrieving and storing a source resource location address, a second memory for retrieving and storing a destination address; and a transmitting section for transmitting a source resource located at the source resource location address to a destination resource located at the destination location address, by performing the steps of:
- storing the source resource location an address in the first memory under remote direction from a remote wireless display terminal;
- establishing a session identifier associated with the data stored at the source resource location resource and a user at the remote wireless display terminal;
- storing an the destination address in the second memory under remote direction from the remote wireless display terminal wherein said destination address in the second memory is different from the, source resource location address; and
- transmitting, responsive at least in part to the session identifier received in a request for the data, the data so indicated by the source resource location address in the first memory to the destination address indicated in the second memory via the Internet.

32. The computer readable medium as claimed in claim 31 wherein the addresses stored in the first and second memories and said first remote address refer to Internet protocol addresses on a computer network.

33. A computer readable medium as claimed in claim 31 wherein the computer network is an Internet protocol network.

* * * * *